May 4, 1943.  J. H. DELANEY  2,318,064
SPREADER
Filed May 7, 1941
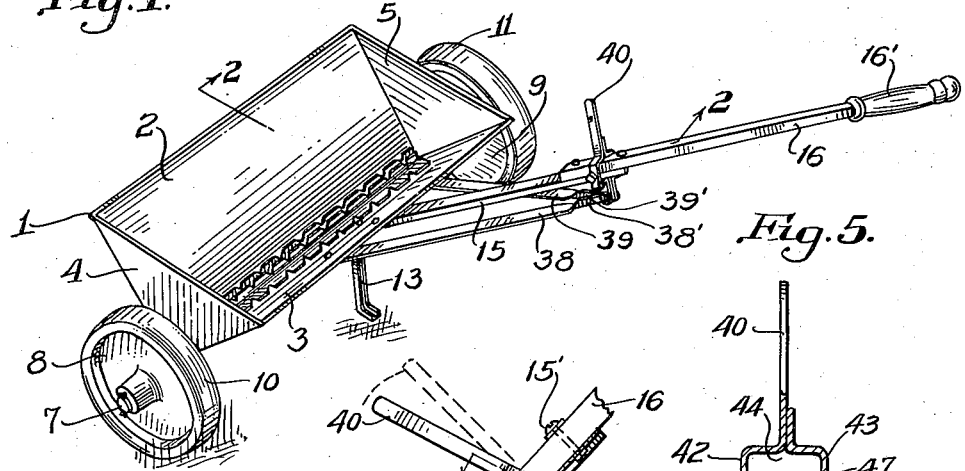
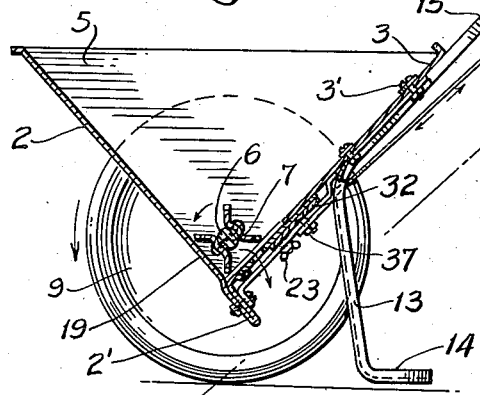
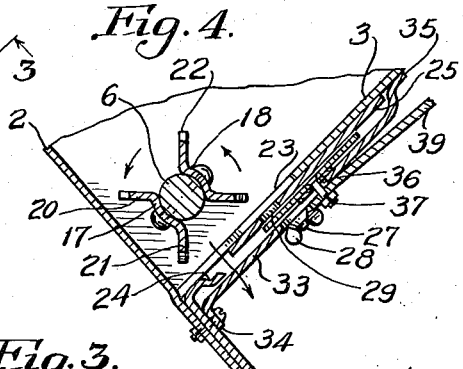
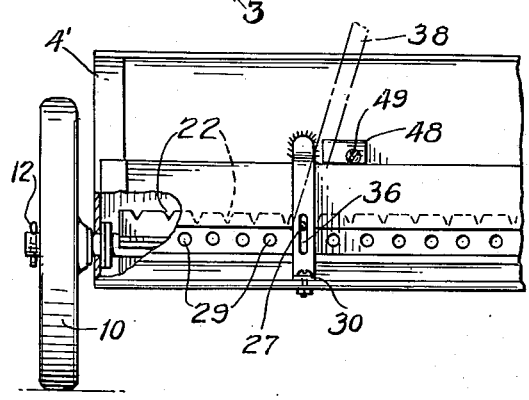
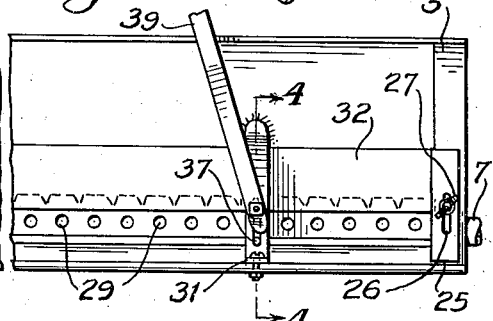
INVENTOR.
James H. Delaney
BY Earl E. Moore
ATTORNEY.

Patented May 4, 1943

2,318,064

UNITED STATES PATENT OFFICE 2,318,064

SPREADER

James H. Delaney, Los Angeles, Calif.

Application May 7, 1941, Serial No. 392,249

9 Claims. (Cl. 221—120)

This invention relates to means for spreading fertilizers and other dry or partly dried substances over grass lawns or other surfaces. This invention is particularly useful in spreading fine or coarse fertilizers and/or seeds or other substances over the ground, especially the fertilizer known as "Vigoro" and the coarser fertilizers known as cow and steer manure.

So far as known, this invention is a definite improvement over prior devices for doing the same kind of work. The prior art does not show spreaders which are equipped to distribute or spread fine and coarse granular materials. Applicant's device has a shiftable plate which is to be used in a downward position when fine material is to be spread, and in an upper position when a coarse material is to be spread over the ground.

Furthermore, the rotary blades of applicant's agitator are provided with notched out portions so as to prevent jamming or sticking of the agitator, thus affording an even distribution of the material along the path followed by the device.

Another important feature of this invention is the construction and arrangement of the gate valve which controls the quantity of the material distributed as well as its function as a stop valve. This action takes place whether coarse or fine material is used, and the means provided for changing the device from a fine to a coarse spreader constitutes simple care-free elements which are easily adjusted by hand without the need of tools. Simple, but sturdy means are provided for operating the gate valve, and much consideration has been given to the positive and dependable operation of the valve even when the device becomes old and weather beaten.

One of the principal objects of this invention is to present a spreading device which is simple and sturdy in construction, free and easy to operate, and economical to manufacture.

Another principal object is to provide a combination spreading device that is quickly convertible for evenly spreading coarse or fine material, and that is adjustable so that the quantity of the material spread can be regulated to desired amounts.

Other objects, advantages and features of my invention will appear from the accompanying drawings, the subjoined detailed description, the preamble of these specifications and the appended claims.

Applicant is about to illustrate and describe one of the forms of his invention in order to teach one how to make, use and vend the same, but it is to be understood that the drawing and description thereof are not to limit the invention in any sense whatsoever, except as limited by the appended claims.

In the drawing:

Fig. 1 shows the preferred form of my inventive device in perspective view with the egress openings closed.

Fig. 2 is a vertical cross section taken substantially along the line 2—2 of Fig. 1, a part thereof being broken away.

Fig. 3 is a rear view of the device taken on the plane indicated by the line 3—3 of Fig. 2, parts thereof being broken away.

Fig. 4 is a detailed sectional part taken substantially along the line 4—4 of Fig. 3.

Fig. 5 shows a detailed sectional part taken substantially along the line 5—5 of Fig. 2.

The illustrated form of the invention comprises an elongated V-shaped body or bin I having front and rear walls 2 and 3 respectively, and end V-shaped side walls 4 and 5, which may be sheet metal, wood or plastics. These walls are joined together, as shown, by welding or riveting or as much as possible may be stamped from a single blank and bent to form the bin and the free edges thereof welded or riveted together. At the lower points of the end walls 4 and 5, bearing holes 6 are provided to receive the shaft 7 which has journalled at its ends the wheels 8 and 9, each of which has the rubber tires 10 and 11 respectively. Any suitable means, such as the cotter pins 12 may be employed to prevent the wheels leaving the shaft. The ends of the shaft are flattened or squared to snugly fit the squared bore of each wheel so that the wheels cause the shaft to rotate when the device is pushed over any surface, such as the ground to be spread with fertilizer and the like.

To the center of the rear wall 3, there is fixed, as by screws or bolts 3', a single leg element 13 having a foot 14 and a bar 15 bent at the angles shown so that the bin can be held in vertical non-tipping position when left unattended. The leg 13, foot 14 and bar 15 are preferably made from a single piece of metallic bar such as iron or steel. Fixed to the upper end of the bar 15, is a wooden handle or tongue 16, and they are shown as being joined together by the bolts 15'. The far end of the handle is provided with a rubber hand grab 16'.

On opposite sides of the shaft 7 are the elongated blade elements 17 and 18 having their longitudinal axis joined to the shaft by spaced apart bolts 19. Instead of using bolts, obviously, these elements may be welded to the shaft in the position shown. Each element has the integral radial blades 20 and 21 extending therefrom which, when rotated by the shaft, agitate the material within the bin so as to break up agglomerated masses of the material and to urge it through the holes and/or slits or other egress openings provided for the purpose. Each blade, along the edge thereof, is provided with a plurality of spaced apart notches 22 or the like for a purpose to be explained later.

The rear wall 3, Fig. 3, is shown as being joined to the side flanges 4' and 5' of the end walls 4 and 5 respectively. Between these flanges, the lower portion of the rear wall has been cut off to provide an elongated opening 23. At the bottom of this opening, the lower portion thereof, 2', has been bent over itself to form a strong reenforced rib along the bottom of the bin. The edge of this portion 2' is bent to form the offset portion 24 to receive a perforated valve plate or a lower edge of the movable plate 25, see Fig. 4. This plate extends almost the full width of the bin, and is provided with a vertical slot 26 at each end thereof. A stud bolt 27 is welded or otherwise securely fixed to the lower portion of each flange 4' and 5' and extends through the slots 26. The threaded end of each stud bolt is provided with a wing nut 28. Along the lower edge of the plate are a plurality of spaced apart holes 29 which are in staggered relation with the notches 22 of the rotary blades 20 and 21. Whenever coarse material is to be spread, the plate 25 is raised and fixed in raised position by loosening and tightening the winged nuts 28 in a manner which is now apparent. The distance the plate is raised would depend upon the coarseness of the material to be spread.

Two spaced apart brackets 30 and 31 provide support and guide means for a valve element or a flat gate valve 32. Each one of these brackets consists of a metal strap 33, see Fig. 4, having its lower end turned to form a flange 34 which is bolted to the lapped over portion 2' of the front wall 2 of the bin. The upper end of the strap is offset to form a short flange 35 which is welded to the side of the rear wall 3 of the bin. A slot 36 is provided in each strap to accommodate the stem of a bolt 37 and allow the stem to freely ride in the slot. The head of the bolt in each strap is countersunk in the gate valve 32. The other ends of the bolts are attached to their respective pull and push bars 38 and 39; the bolts are fitted in holes at the ends of the bars 38 and 39 and held therein by the washers and nuts as shown.

The upper ends of the pull and push bars 38 and 39 are turned to provide flat surfaces 38' and 39' to engage the lower end of the lever 40. The lower end of the lever and the ends 38' and 39' are held in pivot relation by the loose rivet 41. The lever 40 is made of two complementary parts 42 and 43, see Fig. 5, which are spread apart to provide an opening 44 to receive the lower portion of the handle 16 and the upper portion of the bar 15. The handle 16 and lever parts 42 and 43 are provided with alined holes which receive the long bolt 45. Intermediate the sides of the lever parts 42 and 43 and the handle there are spring washers 46 and 47 which allow the lever to freely swing about the pivot axis 45, but offers, however, enough friction to prevent the lever accidentally moving unless forced by the operator's hand.

Because of the construction just explained, it is now apparent that the gate valve 32 is raised when the lever 40 is pushed forward as shown in full lines in Fig. 2, and that the gate valve is closed when the lever is pulled rearwardly to the dotted line position.

To control the limits to which the gate valve 32 can be raised, an adjustable block 48 is provided. This block is pivoted to the rear wall of the bin by a rivet 49; the rivet being eccentric to the block so that the block can be turned and provide three or four stop positions for the gate valve. Any edge of the block can be turned to meet the upper edge of the gate valve and stop its movement so as to vary the amount of the area of the holes 29 which are open to allow egress of the material to be spread; for instance, fine fertilizer or cow manure.

Note in particular that the gate valve is raised vertically only and not at an angle with respect to the rear wall 3. Further note that the valve is raised by the two bars 38 and 39 which are attached to the gate valve at equal distances from the longitudinal center thereof so that the lever, when pulled or pushed, easily closes or opens same. So far as known, other spreaders do not have this feature and are likely to stick and become awkward to operate after a few months of use. To further assure even and smooth operation of the spreading device, the blades have a plurality of V-shaped notches 22 situated between the egress holes 29. It has been found that these notches are very essential for smooth operation. When the notches are not employed, fertilizer tends to jamb between the blades 20 and 21 and the rear wall 3 at points intermediate the holes 29. It was found by tests, that the notches 22 eliminate these troubles entirely and prevents the wheels from skidding along the ground as well as causing the spreader to distribute the fertilizer evenly over the ground.

Having thus described my invention, what is claimed as new and desired to be secured by Letters Patent is:

1. In a device for spreading material, a bin having ends and sides to hold the material to be spread, wheels journalled at the ends of the bin, the bin near its bottom having a shiftable plate with a plurality of egress openings, a valve element slidable along the bin and adapted to open and close the openings, guide brackets fixed to one side of the bin and accommodating the valve element between it and the side of the bin, and means to operate the valve element.

2. The device recited in claim 1 wherein the bin is provided with a handle extending therefrom, said means including a lever pivoted to the handle, and bars pivoted to the lever and coupled to the slidable valve element so that movement of the lever opens and closes the egress openings.

3. The device recited in claim 1 including a handle extending from the bin, a lever straddling the handle and pivoted thereto, bars connecting the lever with said slidable valve element to raise and lower it, and resilient friction means between the lever and handle so that the lever will remain in any adjusted position.

4. The device recited in claim 1, including a handle extending from the bin, a lever straddling the handle and pivoted thereto, bars connecting the lever with the slidable valve element to raise and lower it, and resilient friction means between the lever and handle so that the lever will remain in any adjusted position, said brackets having slots, pins fixed to the valve element and extending through the slots so that the valve element can be moved vertically only.

5. A device for spreading material, a bin with wheels for rolling it along a surface, said bin having end panels and a front and rear wall, the front and rear walls joining together to form a V-shaped bottom for the bin, one of the walls having an elongated opening at its bottom normally closed by a shiftable perforated plate, means to hold the plate in raised position, a gate valve vertically movable and adapted to close the perforations in the plate, a handle extending from the bin, and means pivoted to the handle for operating the valve.

6. A device for spreading material comprising a bin with end panels, front and rear walls, said walls forming a V-like shaped bottom for the bin, one of the walls having an elongated slot at its lower edge, a shiftable plate having a plurality of egress openings along the lower edge thereof and adapted to register with the slot, a shaft extending along the bottom of the bin and passing through said end panels, a wheel at each end of the shaft and keyed thereto, blades on the shaft within the bin for agitating the material in the bin and aid same through the egress openings, said blades having notches along the edges thereof to avoid friction between the material and either wall of the bin.

7. The device recited in claim 6 wherein the notches are positioned along the blades so as to work intermediate said egress openings of the plate.

8. In a device for spreading material, a bin having ends and sides to hold the material to be spread, wheels journalled at the ends of the bin, the bin near its bottom having a plurality of egress openings, a valve plate slidable along the bin and adapted to open and close the openings, guide brackets fixed to one side of the bin and accommodating the valve plate between it and the side of the bin, and means to operate the valve plate removed from the bin, a shaft in the bin along the bottom thereof and having its ends keyed to the wheels, blades fixed to the shaft to revolve therewith, said blades having a plurality of notches along their edges.

9. In a device for spreading material, a bin having ends and sides to hold the material to be spread, wheels journalled at the ends of the bin, the bin near its bottom having a plurality of egress openings substantially from end to end thereof, a valve plate slidable along the bin and adapted to open and close the openings, guide brackets fixed to one side of the bin and accommodating the valve plate between it and the side of the bin, and means to operate the valve plate removed from the bin, a shaft in the bin along the bottom thereof and having its ends keyed to the wheels, blades fixed to the shaft to revolve therewith, said blades having a plurality of notches along its edges, said notches being positioned along the blades to work between the egress openings for the purposes described.

JAMES H. DELANEY.